United States Patent
Aharoni et al.

(10) Patent No.: US 12,360,965 B2
(45) Date of Patent: Jul. 15, 2025

(54) MIGRATING DATA BETWEEN HETEROGENEOUS CLOUD BLOCK DEVICES

(71) Applicant: Dell Products, L.P., Round Rock, TX (US)

(72) Inventors: Dan Aharoni, Brookline, MA (US); Anthony Cinelli, Wellesley, MA (US); Arieh Don, Newton, MA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/516,592

(22) Filed: Nov. 21, 2023

(65) Prior Publication Data

US 2025/0165441 A1    May 22, 2025

(51) Int. Cl.
  *G06F 16/00* (2019.01)
  *G06F 16/21* (2019.01)
(52) U.S. Cl.
  CPC .................... *G06F 16/214* (2019.01)
(58) Field of Classification Search
  CPC .................................................. G06F 16/214
  See application file for complete search history.

(56) References Cited

U.S. PATENT DOCUMENTS

| | | | | |
|---|---|---|---|---|
| 9,507,845 B1* | 11/2016 | Natanzon | ............ | G06F 11/2094 |
| 2007/0195692 A1* | 8/2007 | Hagglund | ............ | G06F 11/2058 |
| | | | | 370/216 |
| 2011/0066819 A1* | 3/2011 | Mashtizadeh | ....... | G06F 9/45558 |
| | | | | 711/E12.001 |
| 2017/0177689 A1* | 6/2017 | Bonnell | ............. | G06F 16/2358 |
| 2018/0213036 A1* | 7/2018 | Vasetsky | ............. | H04L 41/0896 |
| 2020/0167323 A1* | 5/2020 | Swamy | ................ | G06F 16/256 |
| 2021/0263762 A1* | 8/2021 | Kachare | ............. | G06F 12/0868 |

\* cited by examiner

*Primary Examiner* — Syed H Hasan
(74) *Attorney, Agent, or Firm* — Amin, Turocy & Watson, LLP

(57) ABSTRACT

A migration management application may facilitate generating an image of a source cloud block drive formatted according to a first format. The management application may facilitate copying of the image to a target cloud block drive formatted according to a second format. Changes directed to the source drive during copying of the image may be stored to a first journal, which may be copied to the target drive. During copying of the first journal, changes directed to the source drive may be stored to one or more subsequent journals. Upon determining that a subsequent journal is smaller than a configured cutover criterion, the management application may pause, during a cutover period, directing of changes to the source drive. The management application may copy changes, directed to the source drive during the cutover period, to the target drive and may redirect user/data applications to operate with respect to the target drive.

20 Claims, 10 Drawing Sheets

700

705 — A method, comprising facilitating, by a management application executing on a server comprising at least one processor and communicatively coupled via a communication network, migrating, during a migration period from first storage that is communicatively coupled via the communication network to second storage that is communicatively coupled via the communication network, application data that is stored by the first storage, wherein a change log is configured to store change information corresponding to changes to be made to the application data during the migration period

710 — receiving, by the management application, at least one log characteristic indication indicative of at least one log characteristic, corresponding to the change log, associated with change information stored to the change log during the migration period

715 — analyzing, by the management application, the at least one log characteristic with respect to at least one cut-over criterion to result in an analyzed log characteristic

720 — based on the analyzed log characteristic indicating that the at least one cut-over criterion has been satisfied, facilitating, by the management application, directing of at least one data change to be made to the application data to be made after the migration period

┌─────────────────────────────────────────────────────────────────────────┐
│ A management server, communicatively coupled with network equipment that is part of a │
│ communication network, comprising a processor configured to process executable instructions │
│ that, when executed by the processor, facilitate performance of operations, comprising │
│ generating a data copy comprising application data corresponding to first block storage │
│ equipment communicatively coupled with the network equipment │
└─────────────────────────────────────────────────────────────────────────┘ 805

┌─────────────────────────────────────────────────────────────────────────┐
│ copying, during a migration period, the data copy to second block storage equipment │
│ communicatively coupled with the network equipment │
└─────────────────────────────────────────────────────────────────────────┘ 810

┌─────────────────────────────────────────────────────────────────────────┐
│ generating, during the migration period, a change log configured to store change information │
│ corresponding to at least one data change, directed to the first block storage equipment, to be │
│ made to the application data │
└─────────────────────────────────────────────────────────────────────────┘ 815

┌─────────────────────────────────────────────────────────────────────────┐
│ receiving at least one log characteristic indication indicative of at least one log characteristic, │
│ corresponding to the change log, associated with storing of change information to the change │
│ log during the migration period │
└─────────────────────────────────────────────────────────────────────────┘ 820

┌─────────────────────────────────────────────────────────────────────────┐
│ analyzing the at least one log characteristic with respect to at least one cut-over criterion to │
│ result in an analysis result │
└─────────────────────────────────────────────────────────────────────────┘ 825

┌─────────────────────────────────────────────────────────────────────────┐
│ analyzing the at least one log characteristic with respect to at least one cut-over criterion to │
│ result in an analysis result │
└─────────────────────────────────────────────────────────────────────────┘ 830

905 A non-transitory machine-readable medium, comprising executable instructions that, when executed by a processor of a computer server communicatively coupled with a communication network via network equipment, facilitate performance of operations, comprising generating a data copy comprising application data, stored according to a first block drive format by a first cloud block drive communicatively coupled with the communication network

910 copying, during a first journal creation period, the data copy to a second cloud block drive, communicatively coupled with the communication network, wherein the application data corresponding to the data copy is to be stored by the second cloud block drive according to a second block drive format

915 copying, a first journal to the second cloud block drive during a first journal copying period, wherein the first journal comprises first change information, to be made to the application data, directed to the first cloud block drive during the first journal creation period, and wherein the first change information is to be stored by the second cloud block drive according to the second block drive format

920 analyzing a first journal characteristic, corresponding to the first journal, with respect to at least one cut-over criterion to result in an analyzed first journal characteristic

925 based on the analyzed first journal characteristic indicating that the at least one cut-over criterion has been satisfied by the first journal characteristic, directing at least one data change applicable to the application data during the first journal copying period

FIG. 9

MIGRATING DATA BETWEEN HETEROGENEOUS CLOUD BLOCK DEVICES

BACKGROUND

The term 'cloud' may refer to a set, group, collection, or other plurality of computing resources, components, services, instances, collections, application, and the like that may be accessed by a computing resource, typically via a communication network (a communication network may also be referred to as a cloud). The term 'cloud' is typically used in reference to the computing resources without referencing specific items them make up the cloud resources when discussing computing functionality from the perspective of a computing resource that may make use of the functionality.

A cloud computing service provider may make available various computing resources, for example, software as a service, virtual machines, storage, bare metal computing hardware, or even a complete enterprise's infrastructure and development platforms, over a communication network. A cloud services provider may make a public cloud computing resource available to users over a publicly accessible network, such as the Internet. A private cloud computing resource is typically available or accessible only by a given customer, such as an enterprise and its employees. Computing resources may be provided from an enterprise's own on-premises data center or from a data center operated by an independent (e.g., independent from the enterprise customer) cloud services provider. A hybrid cloud may connect an organization's private cloud services and resources of public clouds into an infrastructure that facilitates the organization's applications and workloads in a manner that balances the maximizing of performance and the minimizing of costs across public and private cloud computing resources.

Cloud providers, whether providers of public or private computing resources, may use clustering of servers. A server cluster typically comprises servers that share a single Internet Protocol ("IP") address. Clustering enhances data protection typically, availability, load balancing, and scalability. A server associated with a cluster may be referred to as a node, which may comprise storage components such as hard drives or solid state drives, random access memory, ("RAM"), and central processing unit ("CPU") resources.

Data storage computer systems or components can facilitate the storage and manipulation of data by a variety of different network equipment. Data may be stored on a network storage component, which may be referred to as a storage or a storage array, and which may comprise a hard drive, a magnetic media drive, a solid-state drive, a memory, and the like. Manipulation may refer to one or more actions performed to a storage unit, such as a file, or files, which actions may comprise reading, writing, copying, moving, deleting, and the like.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example embodiment method may comprise facilitating, by a management application executing on a server comprising at least one processor and communicatively coupled via a communication network, migrating, during a migration period from first storage that is communicatively coupled via the communication network to second storage that is communicatively coupled via the communication network, application data that is stored by the first storage, wherein a change log is configured to store change information corresponding to changes to be made to the application data during the migration period. The method may further comprise receiving, by the management application, at least one log characteristic indication indicative of at least one log characteristic, corresponding to the change log, associated with change information stored to the change log during the migration period. The method may further comprise analyzing, by the management application, the at least one log characteristic with respect to at least one cut-over criterion to result in an analyzed log characteristic, and based on the analyzed log characteristic indicating that the at least one cut-over criterion has been satisfied, facilitating, by the management application, directing of at least one data change to be made to the application data to be made after the migration period.

In an embodiment, the change log may be, or may comprise, a journal. In an embodiment, the at least one data change to be made to the application data after the migration period may be a result of at least one of at least one of a write command, or a delete command.

In an embodiment, the at least one log characteristic may be a log size of the change log. The at least one cut-over criterion may comprise a criterion defined with respect to a reference size. The log size may have been determined not to be greater than the reference size. The directing of the at least one data change to be made to the application data, based on the analyzed log characteristic indicating that the at least one cut-over criterion has been satisfied, may comprise causing the at least one data change to be made to the application data to be directed to the second storage.

In an embodiment, the at least one log characteristic may be a log size of the change log. The at least cut-over criterion may comprise a criterion defined with respect to a reference size. The log size may have been determined not to be less than the reference size. The directing of the at least one data change to be made to the application data, based on the analyzed log characteristic indicating that the at least one cut-over criterion has been satisfied, may comprise avoidance of the at least one data change to be made to the application data being directed to the second storage.

In an embodiment, the change information stored to the change log may comprise changes to be made to the application data. In an embodiment, the change information stored to the change log may comprise metadata corresponding to changes to be made to the application data.

In an embodiment, the migrating of the application data during the migration period may further comprise facilitating causing the first storage to generate a snapshot of the application data at a beginning time corresponding to the migration period and facilitating copying the snapshot of the application data from the first storage to the second storage.

In an embodiment, an application, other than the management application, corresponding to the application data may be usable during the migration period to direct changes to the application data.

In another example embodiment, a management server, communicatively coupled with network equipment that is part of a communication network, may comprise a processor configured to process executable instructions that, when executed by the processor, facilitate performance of operations, that may comprise generating a data copy comprising application data corresponding to first block storage equipment communicatively coupled with the network equipment and copying, during a migration period, the data copy to second block storage equipment communicatively coupled with the network equipment. The operations may further comprise generating, during the migration period, a change log configured to store change information corresponding to at least one data change, directed to the first block storage equipment, to be made to the application data receiving at least one log characteristic indication indicative of at least one log characteristic, corresponding to the change log, associated with storing of change information to the change log during the migration period. The operations may further comprise analyzing the at least one log characteristic with respect to at least one cut-over criterion to result in an analysis result. Based on the analysis result being that the at least one cut-over criterion has been satisfied by the at least one log characteristic, the operations may further comprise directing at least one data change to be made to the application data resulting in at least one directed data change.

In an embodiment, the satisfaction result of the analysis result with respect to the at least one cut-over criterion may correspond to satisfaction of the at least one cut-over criterion. The directing of the at least one directed data change may further comprise directing the at least one directed data change to the second block storage equipment.

In an embodiment, the analysis result may be that the at least one cut-over criterion has not been satisfied by the at least one log characteristic. The directing of the at least one directed data change may further comprise avoiding directing the at least one directed data change to the second block storage equipment.

The change log may be a first change log. The change information may be first change information corresponding to first changes to be made to the application data. The at least one log characteristic may be at least one first log characteristic. The at least one log characteristic indication may be at least one first log characteristic indication. The analysis result may be a first analysis result. The at least one directed data change may be at least one first directed data change comprising the first change information. The directing of the at least one first directed data change may further comprise copying, after the copying of the data copy to the second block storage equipment, the first change information to the second block storage equipment during a first-change-log-copying period. The operations may further comprise generating, during the first-change-log-copying period, a second change log comprising second change information corresponding to second changes to be made to the application data and receiving at least one second log characteristic indication indicative of at least one second log characteristic, corresponding to the second change log, associated with storing of second change information corresponding to at least one change to be made to the application data during the first-change-log-copying period. The operations may further comprise analyzing the at least one second log characteristic with respect to the at least one cut-over criterion to result in a second analysis result. Based on the second analysis result being that the at least one cut-over criterion has been satisfied by the at least one second log characteristic, the operations may further comprise managing of at least one data change to be made to the application data after the first-change-log-copying period to the second block storage equipment.

In an embodiment, the operations may further comprise copying, after the first-change-log-copying period, the second change information to the second block storage equipment during a second-change-log-copying period. The managing of the at least one data change to be made to the application data after the first-change-log-copying period may further comprise pausing, during a cut-over period after the second-change-log-copying period, the directing, to the a first block storage equipment, of the at least one data change to be made to the application data and directing, after the cut-over period to the second block storage equipment, the at least one data change to be made to the application data.

In an embodiment, the first block storage equipment may comprise a first cloud-based storage block device implemented according to a first cloud-based storage block device format. The second block storage equipment may comprise a second cloud-based storage block device implemented according to a second cloud-based storage block device format. The first cloud-based storage block device format and the second cloud-based storage block device format may be different cloud-based storage block formats.

In an embodiment, the first cloud-based storage block device may be implemented according to a first file system. The second cloud-based storage block device may be implemented according to a second file system. The first file system and the second file system use a same file system.

In yet another example embodiment, a non-transitory machine-readable medium may comprise executable instructions that, when executed by a processor of a computer server communicatively coupled with a communication network via network equipment, facilitate performance of operations, that may comprise generating a data copy comprising application data, stored according to a first block drive format by a first cloud block drive communicatively coupled with the communication network. The operations may further comprise copying, during a first journal creation period, the data copy to a second cloud block drive, communicatively coupled with the communication network, wherein the application data corresponding to the data copy is to be stored by the second cloud block drive according to a second block drive format. The operations may further comprise copying, a first journal to the second cloud block drive during a first journal copying period, wherein the first journal comprises first change information, to be made to the application data, directed to the first cloud block drive during the first journal creation period, and wherein the first change information is to be stored by the second cloud block drive according to the second block drive format. The operations may further comprise analyzing a first journal characteristic, corresponding to the first journal, with respect to at least one cut-over criterion to result in an analyzed first journal characteristic. Based on the analyzed first journal characteristic indicating that the at least one cut-over criterion has been satisfied by the first journal characteristic, the operations may further comprise directing at least one data change applicable to the application data during the first journal copying period.

In an embodiment, the analyzed first journal characteristic may indicate that the at least one cut-over criterion has been satisfied. The at least one data change applicable to the application data during the first journal copying period may be applicable to the first cloud block drive. The operations may further comprise pausing, during a cut-over period, the directing, to the first cloud block drive, of the at least one data change applicable to the application data during the first journal copying period and directing, to the second cloud block drive, the at least one data change applicable to the application data during the first journal copying period, wherein the at least one data change is to be stored by the second cloud block drive according to the second block drive format.

In an embodiment, the analyzed first journal characteristic may indicate that the at least one cut-over criterion has not been satisfied. The operations may further comprise copying a second journal to the second cloud block drive during a second journal copying period, wherein the second journal comprises second change information, to be made to the application data, directed to the first cloud block drive after the first journal creation period, and wherein the second change information is to be stored by the second cloud block drive according to the second block drive format. The operations may further comprise analyzing a second journal characteristic, corresponding to the second journal, with respect to the at least one cut-over criterion to result in an analyzed second journal characteristic. Based on the analyzed second journal characteristic indicating that the at least one cut-over criterion has been satisfied by the second journal characteristic, the operations may further comprise pausing, during a cut-over period, the directing, to the first cloud block drive, of the at least one data change applicable to the application data during the second journal copying period. The operations may further comprise directing, to the second cloud block drive, the at least one data change, applicable to the application data during the second journal copying period, to be stored by the second cloud block drive according to the second block drive format.

In an embodiment, the application data may be usable from the first cloud block drive by an application before the cut-over period. The application data may comprise the first change information, the second change information, and the at least one data change applicable to the application data during the second journal copying period and may be usable from the second cloud block drive by the application after the cut-over period. The operations may further comprise directing the application to use, after the cut-over period and from the second cloud block drive, the application data that may comprise the first change information, the second change information, and the at least one data change applicable to the application data during the second journal copying period.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 7 illustrates an exemplary method embodiment.

FIG. 8 illustrates an exemplary server system embodiment.

FIG. 9 illustrates an exemplary non-transitory machine-readable medium embodiment.

DETAILED DESCRIPTION

Generally speaking, one or more embodiments described herein can facilitate monitoring file sharing commands between network equipment to identify adverse conditions. One or more embodiments can use different approaches to, without adversely affecting system performance, detect adverse conditions that can occur when networked equipment uses resource sharing communications (e.g., commands) to alter data on data storage equipment. Monitoring and analyzing commands generated for data manipulation can, in one or more embodiments, result in the detection of malware before damage, such as unauthorized appropriation of data stored to a data store occurs. A data store, such as a hard drive, a magnetic disc drive, a solid-state drive, a memory, and the like, may be referred to as a storage, and may be implemented as a storage that is accessible to multiple computing device. A storage may be a cloud storage that is accessible by multiple computing devices via a network.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
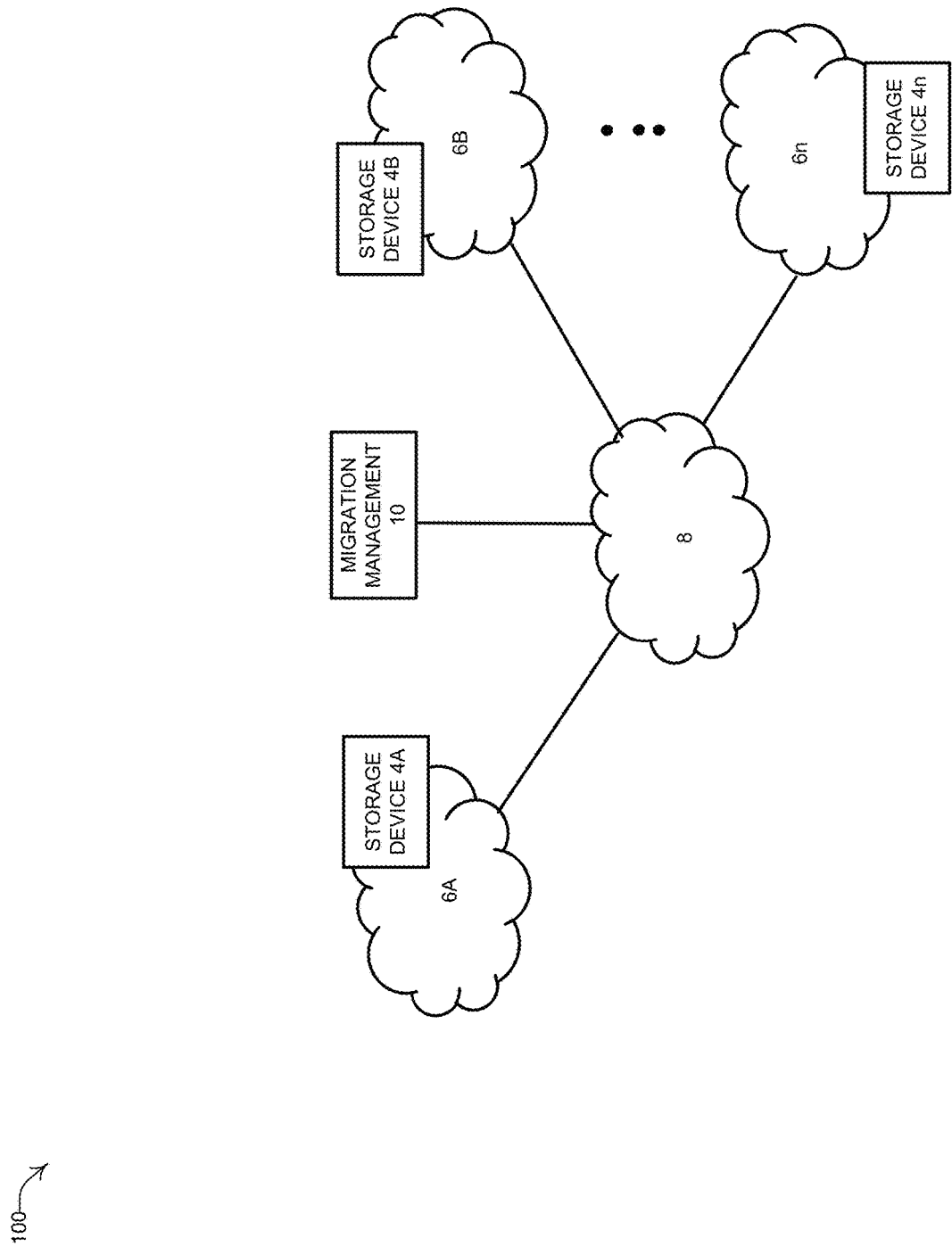
FIG. 1 illustrates an example cloud computing system network environment.

FIG. 1 illustrates a diagram of an example network system 100 that comprises private storage arrays 4A, 4B, ... 4n, that are respectively parts of corresponding private computing systems 6A, 6B, ... 6n, respectively. Private cloud computing systems 6A, 6B, ... 6n may be referred to as private clouds or private cloud networks. Private clouds 6A, 6B, ... 6n may be communicatively coupled with a migration management module 10 via public computing network 8, which may comprise the Internet. Migration management module may comprise a server, or a migration management software application executing on a server, which may be referred to as a migration server. One or more users corresponding to private clouds 6A, 6B, ... 6n (e.g., users who have login credentials that facilitate accessing data stored on one or more private storage arrays 4A, 4B, ... 4n) may desire to migrate data, or an entire logical volume of data, which may be referred to as a block storage drive, or block storage device, from one block storage drive to another. For example, a user may desire to migrate a block storage drive/device, and application data stored thereto, from source private cloud 6A to a target private cloud 6B. In an example, source private cloud 6A may be operated by a first cloud services provider and target private cloud 6B may be operated by a second cloud services provider. A block storage device corresponding to source private cloud 6A may be formatted according to a first format and a block storage device corresponding to target private cloud 6B may be formatted according to a second format. The first or second formats may be proprietary with respect to the different private cloud services providers.

Multiple vendors, or cloud service providers, may offer cloud block drives, for example Amazon Web Services, Inc. ("AWS") may offer a cloud block storage drive formatted according to a format that AWS refers to as Elastic Block Store ("EBS"). Dell Inc. ("Dell") may offer a different cloud block drive storage device format for customers of its cloud storage block drives, and Microsoft Inc. may offer a cloud block storage formatted according to yet another format that is different that the formats used by Dell cloud block storage devices or AWS cloud block storage devices.

When a user, or an application, initiates migration of a block drive from being hosted by one cloud services provider to being hosted by another cloud services provider, seamless migration from a current cloud block device format to another is desirable. For example, when migrating from an AWS EBS cloud block storage representation to a Dell cloud block device representation it is desirable to minimize downtime of an application (e.g., a word processing program or a database program) that may accessing application data (e.g., a text document or a database) stored by a cloud block storage device on a source cloud block storage device while the application data is being migrated to a target cloud block storage device.

According to a conventional technique to migrate data from a source cloud block drive to a target cloud block drive, an application that is accessing the target cloud block drive (e.g., a word processing application making changes to a text document) may be closed while an a block driver corresponding to a format of the target cloud block drive is installed and while a simple copy command (e.g., a Unix 'dd' command or similar) is used to copy block data from the source cloud block device to the target block device. A downside to this technique is that use of the application, such as a word processing application or a database application, is unavailable for use until all data corresponding to the source cloud block drive device has been copied to the target cloud block device, which may consume a significant amount of time based on a size, or amount, of data stored by the source cloud block drive being copied.

According to another conventional technique, Logical Volume Manager ("LVM") or Device Mapper ("DM") migrations tools may be used. An LVM tool may be able to access mirroring tools to facilitate migrations. According to this conventional technique, copying is performed by a host computing device that reads from a block driver corresponding to the source cloud block drive device and writes to a block driver corresponding to the target cloud block drive device. Use of an LVM tool may require time to install (and potentially remove) the LVM tool and may result in reduced drive access performance. Accordingly, use of LVM tools to migrate data may not be desirable for use in migrating data with respect to cloud environments.

A desirable seamless migration technique is one that facilitates an application reading and writing to a source cloud block device while the migration takes place. Existing software tools, for example PowerPath Migration Enabler ("PPME") offered by Dell, that migrate data from one place to another may not facilitate seamless migration between different cloud block drives because they are designed for use with respect to physical drives and may not facilitate migration in a cloud block devices/environment (e.g., a cloud block device is not a simple Small Computer System Interface ("SCSI") drive. Furthermore, another problem with tools such as PPME is that inserting, or installing, such a tool requires downtime and re-pointing of storage volumes to applications.

Applications are typically deployed using a File System ("FS") corresponding to a block storage device. Examples of file systems comprise EXT3, EXT4, and XFS. File systems may use journals to store changes made to data stored on a drive corresponding to the file system. In an example using conventional techniques, an EXT4 FS may have a default mode, which may be referred to as an ordered mode, and may save changes made (e.g., incoming write data and corresponding metadata) in the FS's journal, which changes may be usable for later updates to a storage device (e.g., a physical disc of a cloud virtual disc) corresponding to the storage device. The FS may also use changes saved to a journal when using a command, such as a Unix, or Unix-like, 'fsck' command, to check for disc problems that may need repair. Ordered mode may be useful with respect to computing systems corresponding to a low data change rate, which may minimize a size of the FS journal file. Saving journal data sequentially and locally on disk is effective—changes may be saved locally and applied later to a source storage device. Such local saving of changes to a FS journal and applying the changes later to an actual storage device may be useful when updating a slow storage device (e.g., a storage device that is in the cloud wherein a link to the storage is slow). In an example, an application may write updates to a source storage device, whereupon the updates/changes may be accumulated in, or stored to, a first journal file of the FS. After the first journal reaches a configured journal size, a second journal replaces the first journal as a file for storing updates changes to be made to data stored on the storage. The first journal may be copied to a target device while changes are accumulated in the second journal. When the configured journal size is reached by storage of data changes to the second journal, the first journal may replace the second journal as a repository for accumulation of data changed while the second journal is copied to a target device.

According to embodiments disclosed herein, FS journals may be used to facilitate seamless migration from a current/source cloud block device provider format to another/target cloud block device provider format (e.g., EBS format to a Dell cloud block storage format). According to embodiments disclosed herein, a migration management application may facilitate migration from a cloud block storage device using a first FS to manage data on a cloud disk, which may be a virtual disk or logical disk. The migration management application may be invoked to migrate data, or migrate a cloud block device, comprising application data that may be actively and regularly used and accessed, from one cloud block format to a different cloud block format.

In an embodiment, after migration has been initiation, for example by a migration management application or server, data changes being made to application data, and metadata corresponding to the data changes, may be stored to an FS journal corresponding to a source cloud block drive that is being migrated to a target cloud block drive. An application, corresponding to application data stored by the source cloud block storage device, that is making changes to the application data may continue operation as-is with respect to a user or with respect to another application (e.g., the application, which may be referred to as a user application or a data application, may continue writing to the source cloud block storage and change information corresponding to the write actions may be stored to a FS journal. A new cloud block storage (e.g., the target cloud block storage device) may be instantiated (e.g., a Dell PowerFlex cloud storage volume may be instantiated) to which the source cloud block storage is to be migrated. At an image creation point in time, a copy of data in the existing cloud block storage device to be migrated to the target cloud block storage may be created (e.g., a snapshot or an image may be generated corresponding to the data to be copied at the point in time). Copying of the snapshot/image, which may comprise application data to which changes are directed after the image creation point in time, to the target cloud block storage device may be facilitated by the migration management application. During copying of the snapshot to the target cloud block device, the user/data application may continue to direct changes (e.g., write commands) to the source cloud block device. The FS corresponding to the source cloud block device may store changes directed to the application data during copying of the snapshot/image to a first journal.

After a first stage of migration of data corresponding to a cloud block storage device has finished (e.g., copying of the snapshot from the source cloud block storage device to the target cloud block storage device has finished) an update process may begin. As part of the update process, the first journal may be copied and applied to the target cloud block storage device while application data changes directed to the application data at the source block storage device may be recorded to a second journal at the source block storage device.

After copying of the first journal to the target cloud block storage device has completed, changes to application data stored on the source cloud block storage device may be stored to a next journal file while the second journal is being copied to the target cloud block storage device. In an embodiment, the next journal file may be the same file used for the first journal or the next journal file may be a third journal file. In an embodiment, although only a first journal file and a second journal file may be used in an alternating or 'swinging' manner, each successive journal may be referred to as an incrementally higher journal number than a previous journal number. For example, although only two different journal files may be used to store and copy data changes to be made to application data that is stored by the source cloud block storage device, during migration and updating of data corresponding to the source cloud block storage device successive iterations of journals may be referred to as first journal, second journal, third journal, fourth journal, etc.

Updating of data changes to be made to application data directed to the source block storage device may continue via the 'swinging journal' copy/apply cycle until a configured cut-over point, or cut-over criterion, is satisfied. For example, a cut-over criterion may comprise a file size criterion. Each successive journal may be smaller than a previous journal. For example, a first journal used to store changes to be made to application data while the snapshot is copied from the source cloud block storage device to the target cloud block storage device will likely be the largest journal because it may be used to store changes, or updates, to application data stored on the source cloud block storage device. Because the snapshot will typically comprise more data than a journal that is used to store changes to be made to the application data while a previous journal is being copied from the source cloud block storage device to the target cloud block storage device, time consumed to copy the larger snapshot will likely be much greater than time subsequently consumed to copy a smaller journal from the source cloud block storage device to the target cloud block storage device. In addition, because the time to copy a given journal from the source cloud block storage device to the target cloud block storage device will likely be less than a time to copy a previous journal, successive journals will likely be smaller than a preceding journal. However, depending on the nature of the application data and the type of application that may be making changes to the application data on the source cloud block storage device, it is possible that a given journal may be larger than a previous journal.

As a journal is completed and copied from the source cloud block storage device to the target cloud block storage device, the migration management application may analyze the size of the journal with respect to the cut-over criterion. Upon determining that the size of a journal comprising changes directed to application data at the source cloud block storage device during a previous copying activity, either a copying of the snapshot or a copying of a previous journal, the migration management application may pause, or suspend, directing of changes from the user/data application to the application data at the source cloud block storage device during a cutover period. The cutover period may be a configured period or may be based on a number of changes to the application data that may have been made during copying of the journal that satisfied the cutover criterion.

During the cut-over period, pausing or holding of data 'writes' to the application data directed to the source cloud block storage device may be facilitated by the migration management application while the currently-active journal (e.g., the journal having a journal size that satisfied, or that was less than, the configured cut over criterion size) is pushed/applied to the target cloud block storage device. Since the journal having a size that satisfies the cutover criterion should be small (based on a configured cut-over criterion size), 'writes', or other data changes to be made to the application data directed to the source cloud block storage device may be held, or paused, for an amount of time that is imperceptible, or almost imperceptible, to a user or application that may be using the user/data application to make changes to the application data.

After the journal that satisfied the cutover criterion has been copied to, and applied to, the target cloud block storage device, the migration management application may facilitate diverting/configuring of the user/data application to use the target cloud block storage device instead of the source cloud block storage device and may direct any changes/writes that were directed to the application data while the journal that satisfied the cutover criterion was being copied to the target cloud block storage device and during the cut-over period to the target cloud block storage device. After the user/data application has been configured to operate with the target cloud block storage device instead of the source cloud block storage device, future changes to be made to the application data may be directed to the target cloud block storage device, which may have, or which may correspond to, a different format than a format corresponding to the source cloud block storage device.

Figure 2:
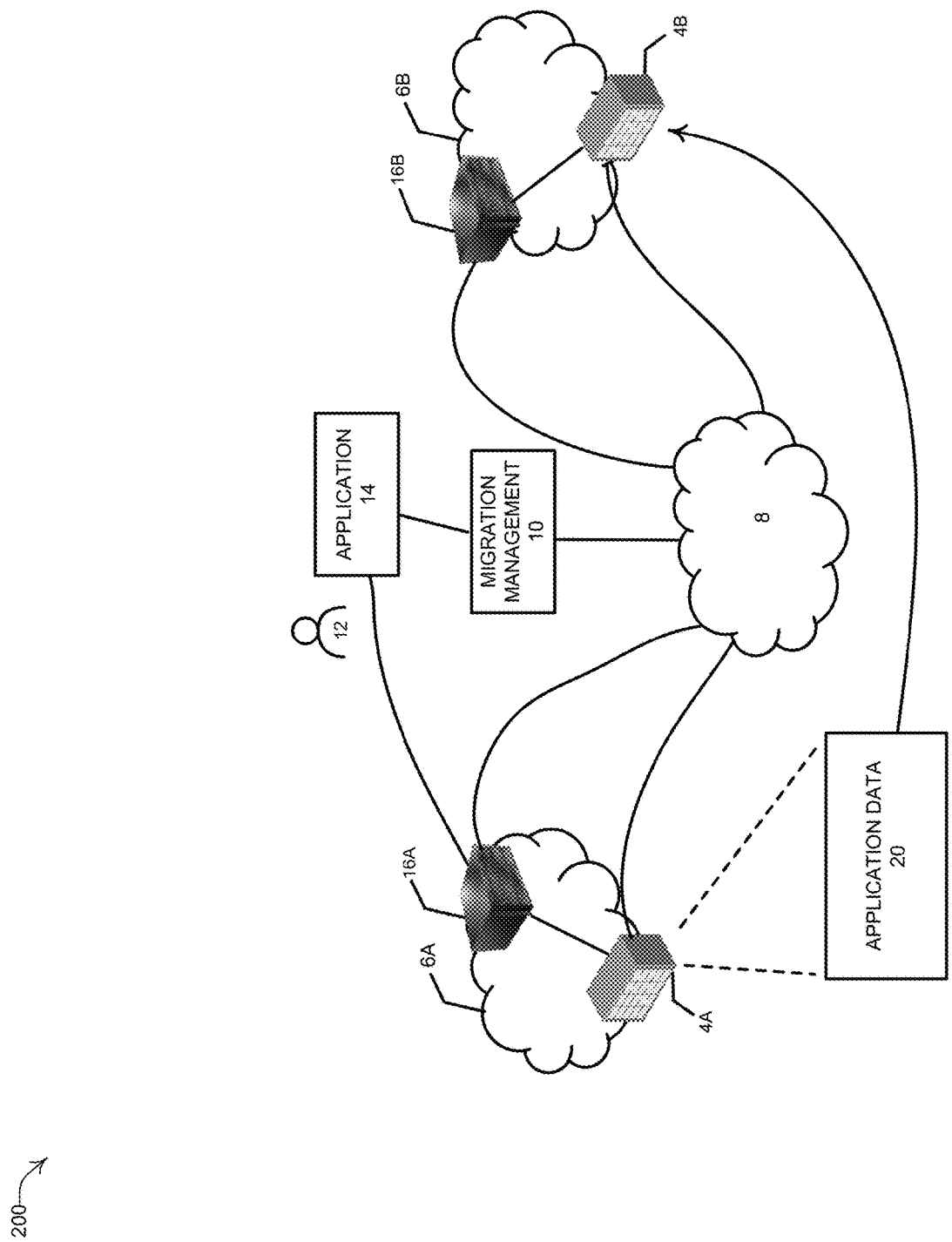
FIG. 2 illustrates a diagram of an example cloud computing system network environment with different cloud block storage devices corresponding to different cloud providers' different formats.

As shown in system 200 of FIG. 2, first private cloud 6A may comprise a cloud host computer, server, 16A and one or more storage devices 4A, which may comprise solid-state disk drives, magnetic disk drives, tape drives and the like. User 12 may use user application 14, which may be referred to as a data application, to interact with application data 20 that may be stored on one or more of devices 4A. Migration management server 10 may be in communication with application 14 and components of private cloud 6A via network 8. User 12, another user, or an application may cause, or instruct, migration management server 10 to initiate migration of application data from a cloud block storage device, which may be facilitated by one or more devices 4A, corresponding to private cloud 6A to a cloud block storage device corresponding to private cloud 6B.

Figure 3:
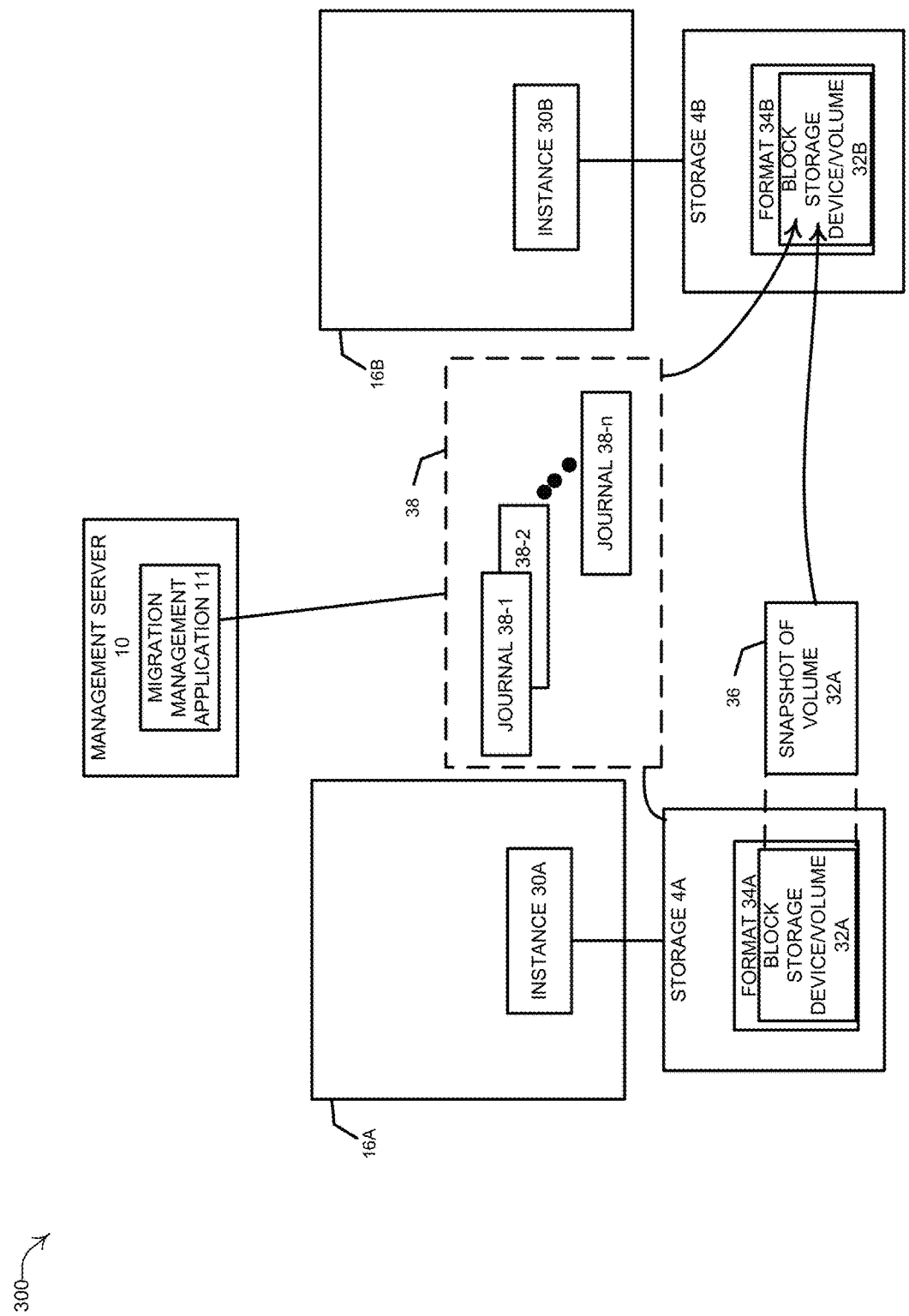
FIG. 3 illustrates an example migrating of data from one cloud block storage device to a different cloud block storage device.
Figure 5:
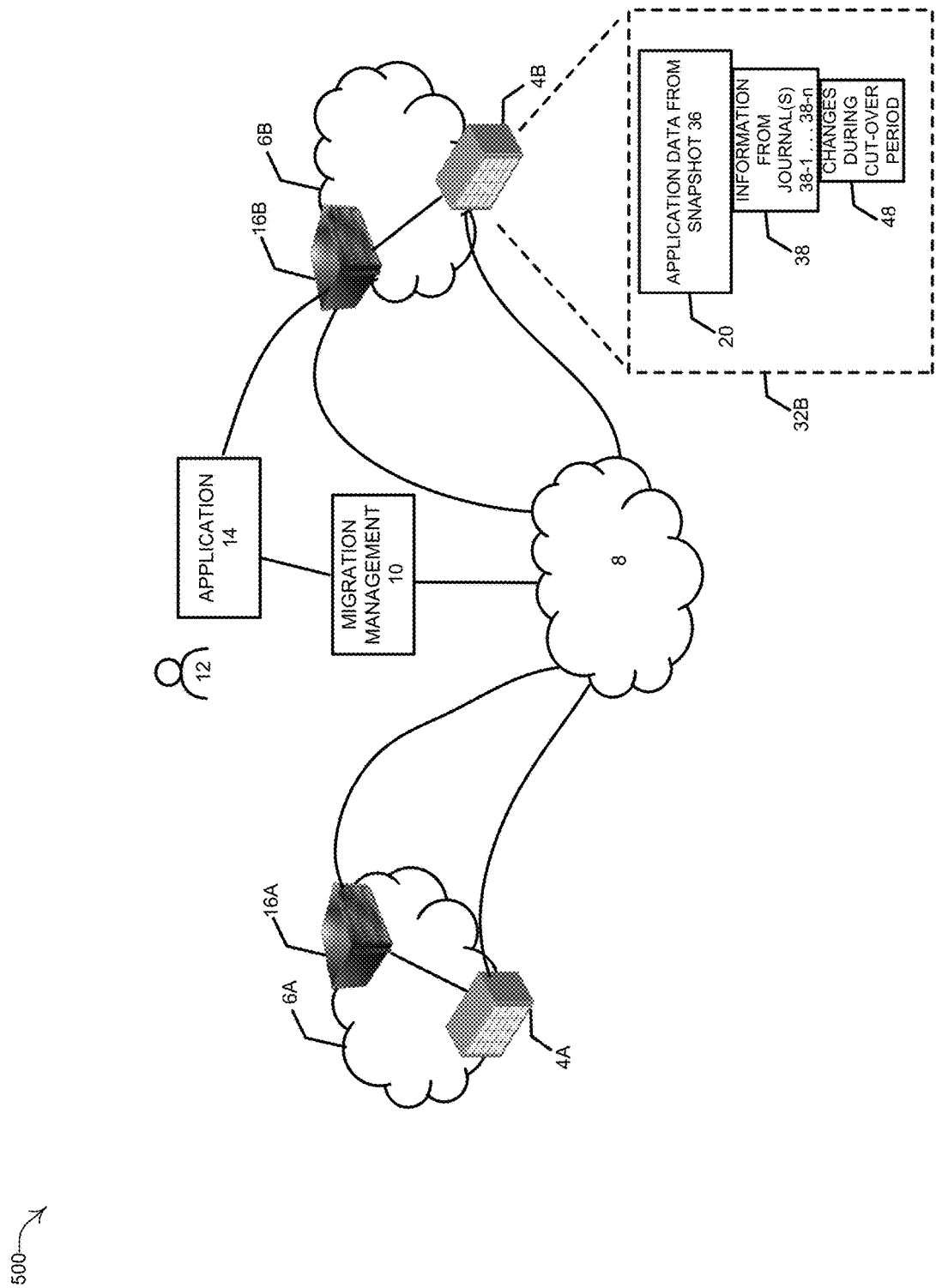
FIG. 5 illustrates an example data migration wherein migrated data is stored at a target block storage device after a cutover period.

Turning now to FIG. 3, the figure illustrates example system 300 with private cloud 16A and private cloud 16B. Private cloud 16A may comprise an instance 30A that facilitates cloud block storage device 32A, which may be a virtual storage device comprising data stored on one or more storage devices 4A corresponding to private cloud 16A. Migration management software 11 may be loaded on, or may be executing on, management server 10. Management application 11 may instantiate instance 30B, which may facilitate a target block storage device 32B being instantiated to be the recipient of an image of block storage device 32A, or application data corresponding thereto, being migrated from private cloud 16A to private cloud 16B. Block storage device 32A may be formatted according to a first format 34A and block storage device 32B may be formatted according to a second format 34B. Migration management software 11 may cause the generation of snapshot 36, which may comprise a snapshot, or an image, of all of, or part of, block storage device 32A. Migration management software 11 may cause the copying of snapshot 36 to second block storage device 32B. During copying of snapshot 36, first journal 38-1 may be generated by block storage device 32A and may comprise changes made to application data 20 stored in first, or source, block storage device 32A, by application 14 shown in FIG. 2. After snapshot 36 has been copied from block storage device 32A to block storage device 32B, migration management application 11 may cause journal 38-1, and change information stored therein, to be copied from source block storage device 36A to target block storage device 32B. While first journal 38-1 is being copied to target block storage device 32B, changes directed to application data 20, as shown in FIG. 2, may be stored by block storage device 32A to second journal 38-2. After first journal 38-1 has been copied to target block storage device 32B, migration management software 11 may cause the copying of second journal 38-2 from source block storage device 32A to target block storage device 32B. Additional journals 38 may be generated during copying of one or more previously generated journals from source block storage device 32A to target block storage device 32B. As journals 38 are generated and copied, migration management application 11 may analyze a size of the journals being generated or copied with respect to a cut-over criterion, which may be a configured, or reference, file size. Based on the analysis of a journal size with respect to the cut-over criterion, migration management application 11 may determine that changes directed to application data 20 shown in FIG. 2, may be paused, held, or buffered during a cut-over period. During the cut-over period, migration management application 11 may direct user application 14 to terminate operation with respect to components of private cloud 6A shown in FIG. 2 and begin operation with respect to components of private cloud 6B, as shown in FIG. 5. As shown in FIG. 5, application 14 is no longer shown connected to, or operating with respect to, private cloud 6A and is shown connected to, and operating with respect to, private cloud 6B. Changes made by application 14 may now be directed to target block storage device 32B, which may comprise application data 20 that was copied via snapshot 36, information from one or more journals 38, and changes 48 that were held, or buffered during the cut-over period.

Figure 4:
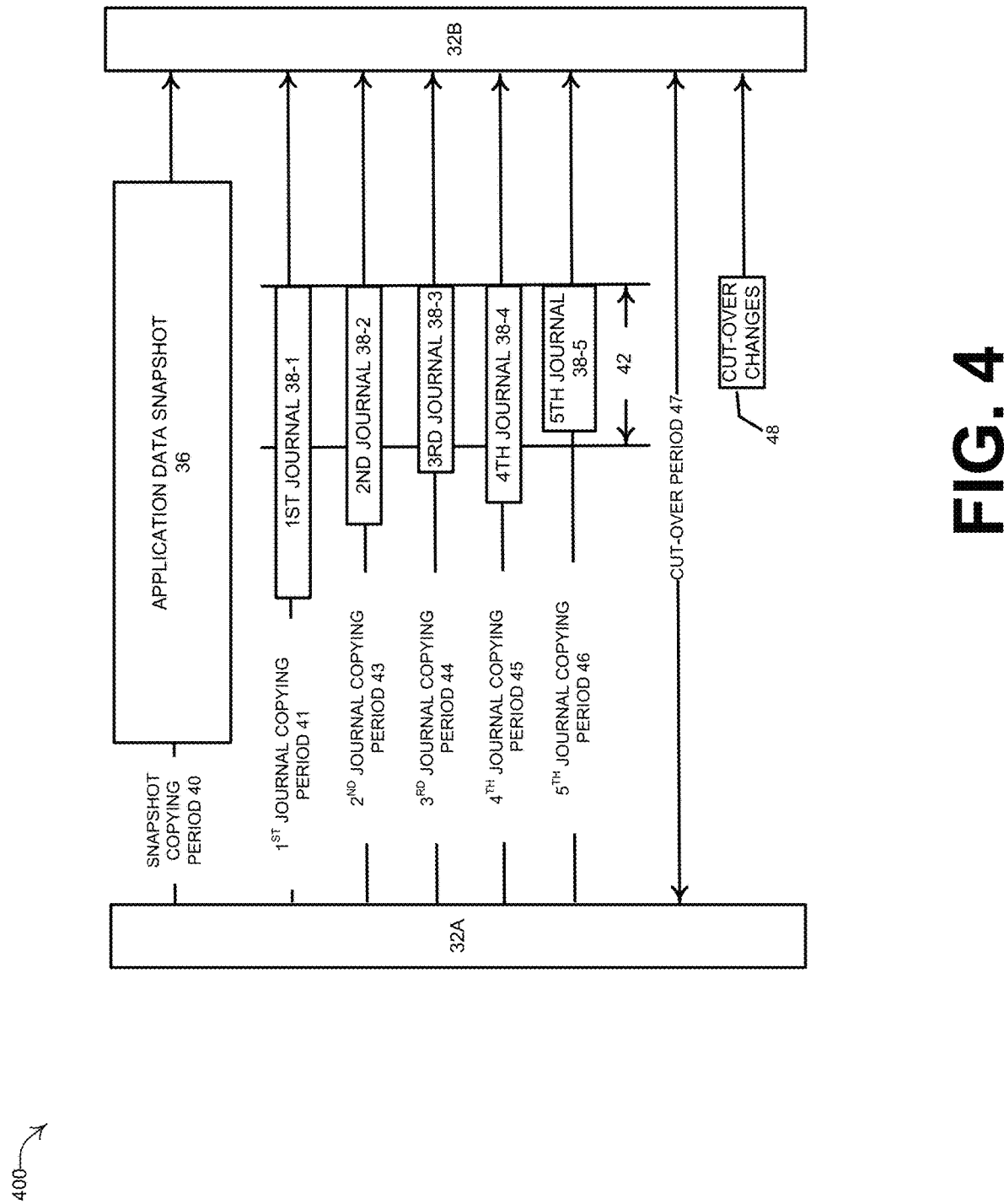
FIG. 4 illustrates an example data migration wherein a cut-over occurs after a journal size is not greater than a cut-over criterion.

As shown in FIG. 4, application data snapshot 36 may copied from source block storage device 32A to target block storage device 32B during snapshot copying period 40. First journal 38-1 may be generated during snapshot copying period 40 and may be copied from source block storage device 32A to target block storage device 32B during first journal copying period 41. Second journal 38-2 may be generated during first journal copying period 41 and may be copied from source block storage device 32A to target block storage device 32B during second journal copying period 43. Third journal 38-3 may be generated during second journal copying period 43 and may be copied from source block storage device 32A to target block storage device 32B during third journal copying period 44. Fourth journal 38-4 may be generated during third journal copying period 44 and may be copied from source block storage device 32A to target block storage device 32B during fourth journal copying period 45. Fifth journal 38-5 may be generated during fourth journal copying period 45 and may be copied from source block storage device 32A to target block storage device 32B during fifth journal copying period 46, and so on until a journal size corresponding to one of journals 38 is less than cut-over criterion size 42.

As discussed previously, each successive, or subsequent, journal 38 may typically be smaller than an immediately preceding journal but may not always be smaller than an immediately preceding journal. In the example shown in FIG. 4, first journal 38-1 is shown smaller than application data snapshot 36. Second journal 38-2 is shown smaller than first journal 38-1, third journal 38-3 is shown smaller than second journal 38-2, but fourth journal 38-4 is shown larger than immediately preceding third journal 38-3. A succeeding journal 38 may be larger than a preceding journal due to various factors, for example, network latency during copying of the preceding journal thus resulting in potentially more data changes directed to application data 20 (shown in FIG. 2) during copying of the preceding journal. Another factor that could cause a succeeding journal 38 to be larger than an immediately preceding journal could be more changes to be made to application data 20 during copying of the immediately preceding journal that were made during copying of a journal preceding the immediately preceding journal.

As shown in FIG. 4, first journal 38-1, second journal 38-2, third journal 38-3, and 4th journal 38-4, are larger than cut-over criterion 42. Thus, because analysis of the first, second, third, and fourth journals has not resulted in satisfaction of cut-over criterion 42, fifth journal 38-5 is generated during copying of fourth journal 38-4. Fifth journal 38-5 is shown being smaller than cut-over criterion 42, or comprising less size (e.g., fewer bytes of data) than the cut-over criterion. Accordingly, migration management application 11, as shown in FIG. 3, may cause future changes directed to application data 20 at source block storage device 32A to be buffered during cut over period 47. During cutover period 47, migration management application 11 may cause operation of application 14 to terminate with respect to source block storage device 32A, or private cloud 6A, and may cause operation of application 14 to begin operating with respect to target block storage device 32B, or private cloud 6A corresponding thereto. Migration management application 11 may cause changes 48, directed to application data 20 during cut-over period 47, to be copied to target cloud block storage device 32B and to be available for use by application 14 after the cutover period.

Figure 6:
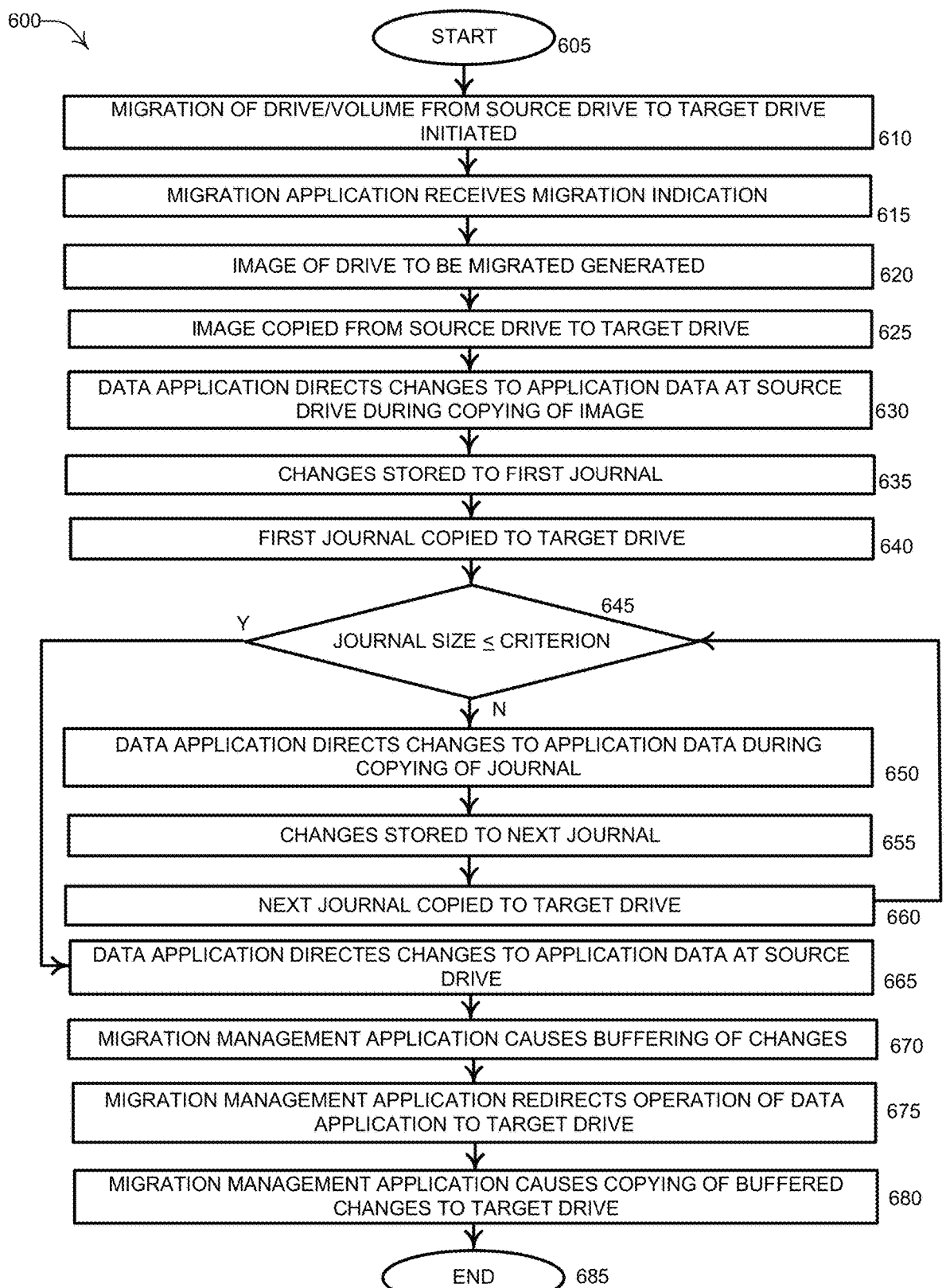
FIG. 6 illustrates a flow diagram of an example method to migrate data from one cloud block storage device to another cloud block storage device.

Turning now to FIG. 6, the figure illustrates a flow diagram of an example method 600 to migrate data from a source cloud block storage device to a target cloud block storage device. Method 600 begins at act 605. At act 610, migration of a source cloud block drive to a target cloud block drive may be initiated. The source cloud block drive may comprise application data, for example, a text document, a database file, a spreadsheet, a drawing file, an image file, a video file, and the like. The migration may be initiated by a user or by an application, which may be, or which may cooperate with, a migration management application. At act 615, the migration management application may receive an indication of the migration initiation. At act 620, the migration management application may cause an image, or snapshot, of the source cloud block drive to be generated. At act 625, the migration management application may cause the image, generated at act 620, to be copied to the target cloud block storage device. At act 630, a data application, for example a word processing application, a spreadsheet application, a database application, a video or image editing application, and the like, may direct changes to the application data at the source cloud block device while the image is being copied to the target cloud block device at act 625. At act 635, the change(s) directed to the source cloud block device at act 630 may be stored to a first journal (a journal may be, or may referred to, as a first log). At act 640, the first journal may be copied to the target cloud block drive. At act 645, the migration management application may analyze a size of the journal, for example in terms of bytes, with respect to a cut-over criterion, which may be a reference size value in terms of bytes.

If a determination is made at act 645 that a size of the journal being evaluated, or analyzed does not satisfy the cut-over criterion (e.g., is not less than or equal to the cut-over criterion), method 600 may advance to act 650. At act 650, the user/data application may direct changes to the application data during copying of the journal, which may be the first journal that comprises change information corresponding to changes to the application data made during copying to the target cloud block drive of the image at act 625, if the performance at act 645 of analyzing the journal size with respect to the cut-over criterion is a first performance at act 645. If the performance of act 645 is not a first performance of act 645, changes directed to the application data at act 650 may be changes that are made during copying of a journal subsequent to copying of the first journal. At act 655, changes directed to the application data at act 650 may be stored to a next journal, which may be a sequentially next journal with respect to a previous journal that may be the first journal or a journal subsequent to the first journal. At act 660, the migration management application may cause, or facilitate, copying of the next journal, to which changes were stored at act 655, to the target cloud block storage drive. After a next journal has been copied to the target cloud block drive at act 660, method 600 returns to act 645 and a size of the next journal that was copied at act 660 is analyzed with respect to the cut-over criterion, and if a determination is made that a the next journal being evaluated at act 645 does not satisfy the cut-over criterion, acts 650, 655, and 660 may be performed as previously described.

Continuing with description of act 645, if the migration management application determines that a size of a journal, which may be the first journal or which may be a journal subsequent to the first journal, satisfies the cut-over criterion, method 600 advances to act 665. At act 665, a data application may direct changes, made while the first journal is being copied to the target cloud block drive at act 640 or while a next journal is copied to the target cloud block drive at act 660, to the application data at the source cloud block drive. At act 670, the migration management application may cause, or facilitate, buffering of changes made at act 665. At act 675, the migration management application may configure, or redirect, operation of one or more data applications, which may have been configured to operate with respect to application data at the source cloud block storage device, to operate with respect to the target cloud block storage device. At act 680, the migration management application may cause copying of changes made to application data that were buffered at act 670 to be copied to the target cloud block drive. Method 600 advances to act 685 and ends. Accordingly, the migration management application may use the first journal and subsequent journals to facilitate recording changes directed to application data that is being migrated from the source cloud block drive device to the target cloud block drive device while a user/data application continues operation with respect to the source cloud block drive device until a cut-over period. The cutover period may correspond to an amount of time consumed to redirect the user/data application to operate with respect to the target cloud block device or to copy/update the target cloud block device with changes directed to the application data during a period corresponding to copying of a journal that satisfied the cutover criterion and copying to the cloud block storage device changes that may have been directed to the application data after the journal that satisfied the cutover criterion was generated. Instead of taking the user/data application 'offline', or causing the user/data application to be inoperable during copying of these source cloud block device image/snapshot, the user/data application may continue operating seamlessly with respect to the application data and a user/application that may make changes to the application data may not perceive downtime during a cutover period due to the journal that satisfied the cut-over criterion being small (based on the configured cut over criterion size) and due to changes directed to the application data being buffered during the cutover and being copied to the target cloud block storage device.

Turning now to FIG. 7, the figure illustrates an example embodiment method 700, comprising, at block 705 facilitating, by a management application executing on a server comprising at least one processor and communicatively coupled via a communication network, migrating, during a migration period from first storage that is communicatively coupled via the communication network to second storage that is communicatively coupled via the communication network, application data that is stored by the first storage, wherein a change log is configured to store change information corresponding to changes to be made to the application data during the migration period; at block 710 receiving, by the management application, at least one log characteristic indication indicative of at least one log characteristic, corresponding to the change log, associated with change information stored to the change log during the migration period; at block 715 analyzing, by the management application, the at least one log characteristic with respect to at least one cut-over criterion to result in an analyzed log characteristic; and at block 720 based on the analyzed log characteristic indicating that the at least one cut-over criterion has been satisfied, facilitating, by the management application, directing of at least one data change to be made to the application data to be made after the migration period.

Turning now to FIG. 8, the figure illustrates an example management server 800, communicatively coupled with network equipment that is part of a communication network, comprising, at block 805 a processor configured to process executable instructions that, when executed by the processor, facilitate performance of operations, comprising generating a data copy comprising application data corresponding to first block storage equipment communicatively coupled with the network equipment; at block 810 copying, during a migration period, the data copy to second block storage equipment communicatively coupled with the network equipment; at block 815 generating, during the migration period, a change log configured to store change information corresponding to at least one data change, directed to the first block storage equipment, to be made to the application data; at block 820 receiving at least one log characteristic indication indicative of at least one log characteristic, corresponding to the change log, associated with storing of change information to the change log during the migration period; at block 825 analyzing the at least one log characteristic with respect to at least one cut-over criterion to result in an analysis result; and at block 830 analyzing the at least one log characteristic with respect to at least one cut-over criterion to result in an analysis result.

Turning now to FIG. 9 the figure illustrates an example non-transitory machine-readable medium 900, comprising executable instructions that, when executed by a processor of a computer server communicatively coupled with a communication network via network equipment, facilitate performance of operations, comprising at block 905 generating a data copy comprising application data, stored according to a first block drive format by a first cloud block drive communicatively coupled with the communication network; at block 910 copying, during a first journal creation period, the data copy to a second cloud block drive, communicatively coupled with the communication network, wherein the application data corresponding to the data copy is to be stored by the second cloud block drive according to a second block drive format; at block 915 copying, a first journal to the second cloud block drive during a first journal copying period, wherein the first journal comprises first change information, to be made to the application data, directed to the first cloud block drive during the first journal creation period, and wherein the first change information is to be stored by the second cloud block drive according to the second block drive format; at block 920 analyzing a first journal characteristic, corresponding to the first journal, with respect to at least one cut-over criterion to result in an analyzed first journal characteristic; and at block 925 based on the analyzed first journal characteristic indicating that the at least one cut-over criterion has been satisfied by the first journal characteristic, directing at least one data change applicable to the application data during the first journal copying period.

In order to provide a context for the various aspects of the disclosed subject matter, the following discussion is intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, for example, by way of illustration, and not limitation, volatile memory 1020 (see below), non-volatile memory 1022 (see below), disk storage 1024 (see below), and memory storage, e.g., local data store(s) 1030 and remote data store(s) 1050, see below. Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 10:
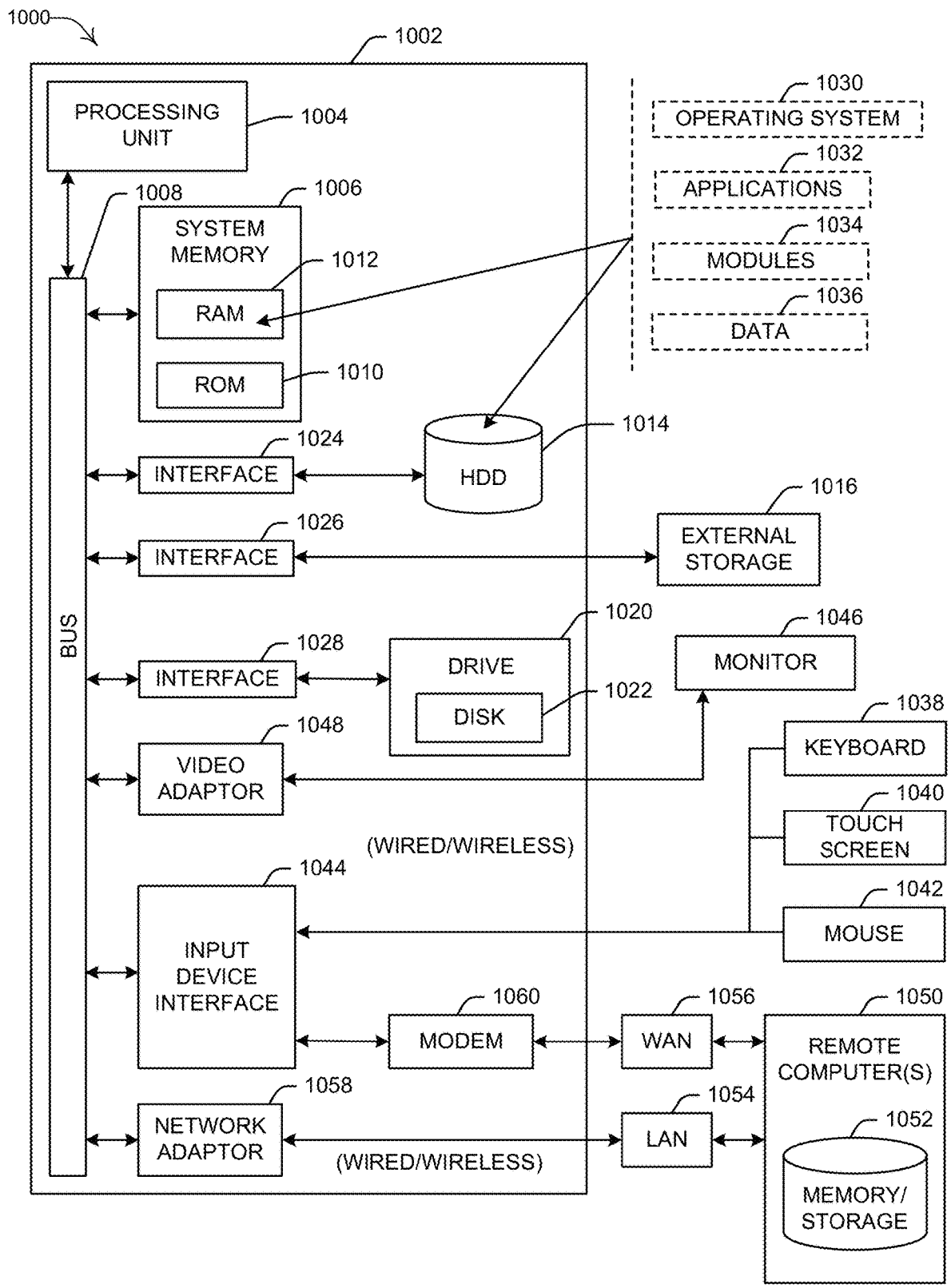
FIG. 10 illustrates an example block diagram of a computer operable to execute an embodiment of this disclosure.

Referring now to FIG. 10, in order to provide additional context for various embodiments described herein, FIG. 10 and the following discussion are intended to provide a brief, general description of a suitable computing environment 1000 in which the various embodiments described herein can be implemented.

While the embodiments have been described above in the general context of computer-executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any datastream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment does not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
    facilitating, by a management application executing on a server comprising at least one processor and communicatively coupled via a communication network, migrating, during a migration period from first storage that is communicatively coupled via the communication network to second storage that is communicatively coupled via the communication network, application data that is stored by the first storage, wherein at least one first change log is configured to store first change information corresponding to first changes to be made to the application data during the migration period;
    receiving, by the management application, at least one first log characteristic indication indicative of at least one first log characteristic, corresponding to the at least one change log, associated with the first change information stored to the at least one change log during the migration period;
    analyzing, by the management application, the at least one first log characteristic with respect to at least one cut-over criterion to result in at least one first analyzed log characteristic;
    copying, by the management application after at least a portion of the application data has been migrated to the second storage, the at least one first log characteristic indication to the second storage during a change-log-copying period;
    generating, by the management application during the change-log-copying period, at least one second change information indication indicative of second changes to be made to the application data;
    receiving, by the management application, at least one second log characteristic indication indicative of at least one second log characteristic, corresponding to the second changes to be made to the application data during the change-log-copying period;
    analyzing, by the management application, the at least one second log characteristic with respect to the at least one cut-over criterion to result in at least one second analyzed log characteristic; and
    based on at least one of the at least one first analyzed log characteristic or the at least one second analyzed log characteristic indicating that the at least one cut-over criterion has been satisfied, facilitating, by the management application, directing at least one data change to be made to the application data after the migration period that does not comprise the first change information.

2. The method of claim 1, wherein the at least one change log is a journal.

3. The method of claim 1, wherein the at least one data change to be made to the application data after the migration period is a result of at least one of at least one of a write command, or a delete command.

4. The method of claim 1, wherein the at least one first log characteristic is a log size of the at least one change log, wherein the at least one cut-over criterion comprises a criterion defined with respect to a reference size, wherein the log size has been determined not to be greater than the reference size, and wherein the directing of the at least one data change to be made to the application data, based on at least one of the at least one first analyzed log characteristic or the at least one second analyzed log characteristic indicating that the at least one cut-over criterion has been satisfied, comprises causing the at least one data change to be made to the application data to be directed to the second storage.

5. The method of claim 1, wherein the at least one first log characteristic is a log size of the at least one change log, wherein the at least cut-over criterion comprises a criterion defined with respect to a reference size, wherein the log size has been determined not to be less than the reference size, and wherein the directing of the at least one data change to be made to the application data, based on at least one of the at least one first analyzed log characteristic or the at least one second analyzed log characteristic indicating that the at least one cut-over criterion has been satisfied, comprises avoiding the at least one data change to be made to the application data being directed to the second storage.

6. The method of claim 1, wherein the first change information stored to the at least one change log comprises the first changes to be made to the application data.

7. The method of claim 1, wherein the first change information stored to the at least one change log comprises metadata corresponding to the first changes to be made to the application data.

8. The method of claim 1, wherein the migrating of the application data during the migration period further comprises:
  facilitating causing the first storage to generate a snapshot of the application data at a beginning time corresponding to the migration period; and
  facilitating copying the snapshot of the application data from the first storage to the second storage.

9. The method of claim 1, wherein an application, other than the management application, corresponding to the application data is usable during the migration period to direct changes to the application data.

10. The method of claim 1, further comprising:
  redirecting operation of one or more data applications, which have been configured to operate with respect to the application data at the first storage, to operate with respect to the second storage.

11. The method of claim 1, wherein the application data that is stored by the first storage is stored according to a first block drive format, wherein the application data is to be stored by the second storage according to a second block drive format, and wherein the at least one data change to be made to the application data to be made after the migration period comprises the application data being changed from the first block drive format to the second block drive format.

12. A management server, communicatively coupled with network equipment that is part of a communication network, comprising a processor configured to process executable instructions that, when executed by the processor, facilitate performance of operations, comprising:
  generating a data copy comprising application data corresponding to first block storage equipment communicatively coupled with the network equipment;
  copying, during a migration period, the data copy to second block storage equipment communicatively coupled with the network equipment;
  generating, during the migration period, a first change log configured to store first change information corresponding to at least one data change comprising first changes, directed to the first block storage equipment, to be made to the application data;
  receiving at least one first log characteristic indication indicative of at least one first log characteristic, corresponding to the first change log, associated with storing of first change information to the first change log during the migration period;
  analyzing the at least one first log characteristic with respect to at least one cut-over criterion to result in a first analysis result;
  based on the first analysis result being that the at least one cut-over criterion has been satisfied by the at least one first log characteristic, directing at least one data change to be made to the application data resulting in at least one first directed data change comprising the first change information, the directing comprising copying, after the copying of the data copy to the second block storage equipment, the first change information to the second block storage equipment during a first-change-log-copying period;
  generating, during the first-change-log-copying period, a second change log comprising second change information corresponding to second changes to be made to the application data;
  receiving at least one second log characteristic indication indicative of at least one second log characteristic, corresponding to the second change log, associated with storing second change information corresponding to at least one second change to be made to the application data during the first-change-log-copying period;
  analyzing the at least one second log characteristic with respect to the at least one cut-over criterion to result in a second analysis result; and
  based on the second analysis result being that the at least one cut-over criterion has been satisfied by the at least one second log characteristic, managing at least one data change to be made to the application data after the first-change-log-copying period to the second block storage equipment.

13. The management server of claim 12, wherein satisfaction of the second analysis result with respect to the at least one cut-over criterion corresponds to satisfaction of the at least one cut-over criterion, and wherein the directing of the at least one data change further comprises:
  directing the at least one data change to the second block storage equipment.

14. The management server of claim 12, wherein the first analysis result is that the at least one cut-over criterion has not been satisfied by the at least one first log characteristic, and wherein the directing of the at least one data change further comprises:
  avoiding directing the at least one data change to the second block storage equipment.

15. The management server of claim 12, wherein the operations further comprise:
  copying, after the first-change-log-copying period, the second change information to the second block storage equipment during a second-change-log-copying period,
  wherein the managing of the at least one data change to be made to the application data after the first-change-log-copying period comprises:
    pausing, during a cut-over period after the second-change-log-copying period, the directing, to the first block storage equipment, of the at least one data change to be made to the application data; and directing, after the cut-over period to the second block storage equipment, the at least one data change to be made to the application data.

16. The management server of claim 12, wherein the first block storage equipment comprises a first cloud-based storage block device implemented according to a first cloud-based storage block device format, wherein the second block storage equipment comprises a second cloud-based storage block device implemented according to a second cloud-based storage block device format, and wherein the first cloud-based storage block device format and the second cloud-based storage block device format are different.

17. The management server of claim 16, wherein the first cloud-based storage block device is being implemented according to a first file system, wherein the second cloud-based storage block device is being implemented according to a second file system, and wherein the first file system and the second file system use a same file system.

18. A non-transitory machine-readable medium, comprising executable instructions that, when executed by a processor of a computer server communicatively coupled with a communication network via network equipment, facilitate performance of operations, comprising:

generating a data copy comprising application data, stored according to a first block drive format by a first cloud block drive communicatively coupled with the communication network;

copying, during a first journal creation period, the data copy to a second cloud block drive, communicatively coupled with the communication network, wherein the application data corresponding to the data copy is to be stored by the second cloud block drive according to a second block drive format;

copying a first journal to the second cloud block drive during a first journal copying period, wherein the first journal comprises first change information, to be made to the application data, directed to the first cloud block drive during the first journal creation period, and wherein the first change information is to be stored by the second cloud block drive according to the second block drive format;

analyzing a first journal characteristic, corresponding to the first journal, with respect to at least one cut-over criterion to result in an analyzed first journal characteristic;

based on the analyzed first journal characteristic indicating that the at least one cut-over criterion has not been satisfied by the first journal characteristic, copying a second journal to the second cloud block drive during a second journal copying period, wherein the second journal comprises second change information, to be made to the application data, directed to the first cloud block drive after the first journal creation period, and wherein the second change information is to be stored by the second cloud block drive according to the second block drive format;

analyzing a second journal characteristic, corresponding to the second journal, with respect to the at least one cut-over criterion to result in an analyzed second journal characteristic;

based on the analyzed second journal characteristic indicating that the at least one cut-over criterion has been satisfied by the second journal characteristic, pausing, during a cut-over period, the directing, to the first cloud block drive, of the at least one data change applicable to the application data during the second journal copying period; and directing, to the second cloud block drive, the at least one data change, applicable to the application data during the second journal copying period, to be stored by the second cloud block drive according to the second block drive format.

19. The non-transitory machine-readable medium of claim 18, wherein the application data is usable from the first cloud block drive by an application before the cut-over period, wherein the application data, comprising the first change information, the second change information, and the at least one data change applicable to the application data during the second journal copying period, is usable from the second cloud block drive by the application after the cut-over period, and wherein the operations further comprise:

directing the application to use, after the cut-over period, the application data, comprising the first change information, the second change information, and the at least one data change applicable to the application data during the second journal copying period, from the second cloud block drive.

20. The non-transitory machine-readable medium of claim 18, wherein the at least one cut-over criterion comprises a reference journal size.

* * * * *